W. D. KILBOURN.
METHOD OF HANDLING MATTE.
APPLICATION FILED FEB. 25, 1910.
974,074.
Patented Oct. 25, 1910.
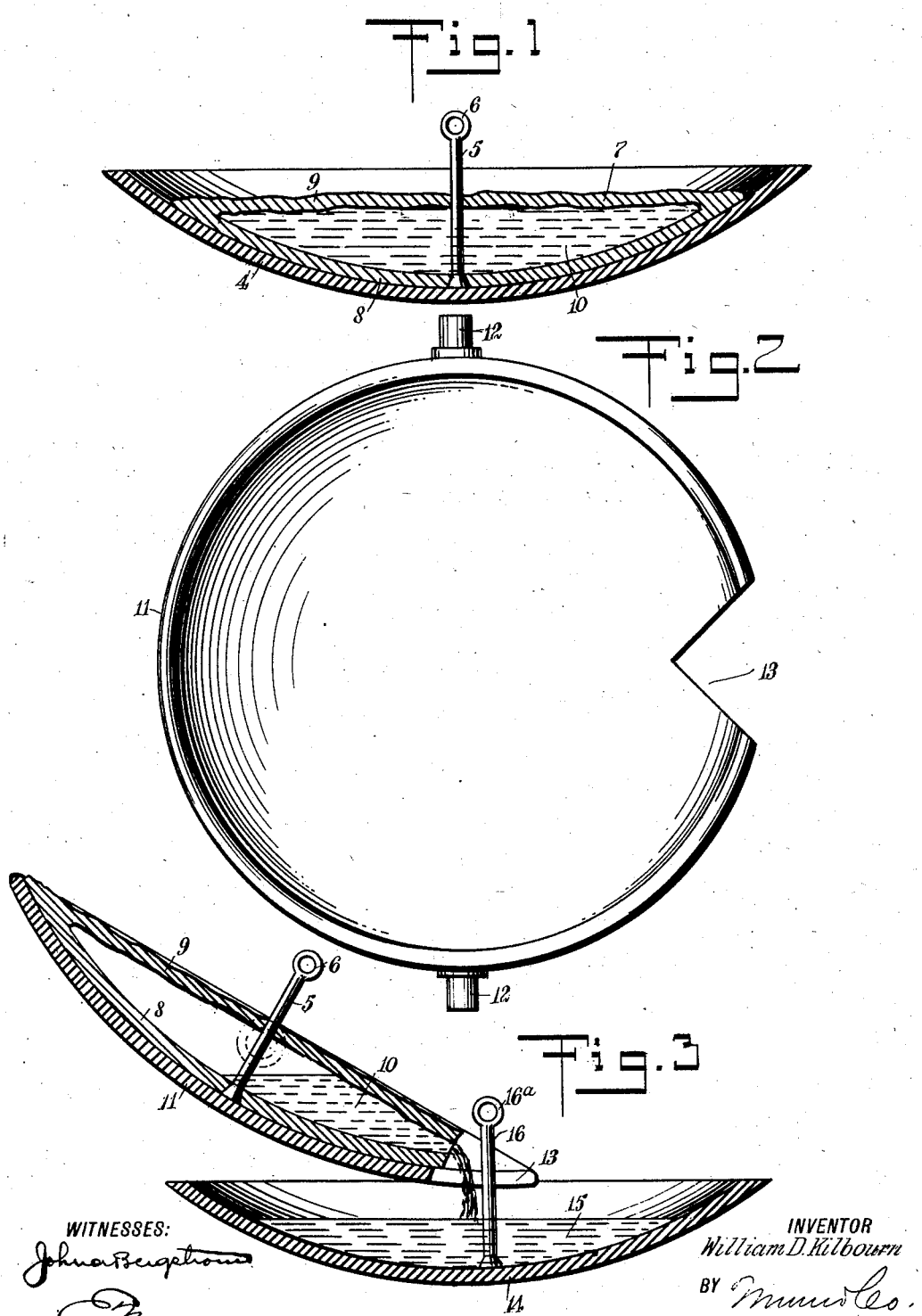

UNITED STATES PATENT OFFICE.

WILLIAM DOUGLAS KILBOURN, OF MURRAY, UTAH.

METHOD OF HANDLING MATTE.

974,074.  Specification of Letters Patent.  Patented Oct. 25, 1910.

Application filed February 25, 1910. Serial No. 545,821.

*To all whom it may concern:*

Be it known that I, WILLIAM DOUGLAS KILBOURN, a citizen of the United States, and a resident of Murray, in the county of Salt Lake and State of Utah, have invented a new and Improved Method of Handling Matte, of which the following is a full, clear, and exact description.

Among the principal objects which the present invention has in view are: To provide a method of handling matter to fracture the same into particles which may be manually handled; to provide a method of handling matte buttons whereby the same are fractured into particles readily reduced for treatment; and to provide a method of handling the matte buttons which is simple and readily performed.

One embodiment of the present invention is disclosed by the structure illustrated in the accompanying drawings, in which like characters of reference denote corresponding parts in all the views, and in which—

Figure 1 is a vertical section of a matte pan containing the matte button partially cooled, the anchor key being held therein; Fig. 2 is a top plan view of a bleeding pan provided for assisting in and controlling the fracture of the matte button; and Fig. 3 is an illustrative view in vertical section showing the bleeding pan in position to bleed the matte button.

The drawings above set forth are provided to aid in the description of the method herein set forth. Other means might be employed with a certain measure of success. At present the matte from the smelting furnaces for reducing metal bearing ores is drawn from the crucible into wide flat circular pans or bowls, designated in the present drawings by the numeral 4. The pans 4 are placed to receive the matte from the furnaces, having had previously deposited in the center thereof a loose anchor pin 5, about which it is the design of the operator that the matte should freeze. The pin 5 is provided with an eyelet 6, to which the grab hook of a suitable derrick is attached when it is desired to lift the matte button from the pan for removal to be subjected to further treatment incident to this method.

In the following method the pans 4 are washed with thin liquid clay, which causes the separation between the button and the pan when the button is raised from the said pan. In the present method the button 7 is so raised when, after from one to three hours, there is formed a solidified wall 8 in direct contact with the pan 4 and a wall 9 forming the upper crust. Between the walls 8 and 9 is a molten mass 10. The button 7 is transferred by a suitable derrick from the pan 4 deposited in a pan 11, termed by me the bleeding pan, for the reason that it is by resting in this pan that the button is bled of the molten mass 10. The pan 11 is provided with trunnions 12, 12. In the operative position of the pan 11 the trunnions 12, 12 are mounted in suitable bearings in standards provided therefor. The pan 11 is also provided with a cut away portion 13, which is illustrated in Fig. 2 as being V-shaped, and is disposed at a point equidistant from the trunnions 12, 12. When the button 7 is transferred from the pan 4 to the pan 11, the pan 11 is tilted to overbalance the side of the pan carrying the cut away portion 13. At the moment of placing the button 7 in the pan 11 the side of the pan having the cut away portion 13 is properly supported by suitable props. It is while the pan is in a substantially horizonal position that the edge of the button 7, overhanging the cut away portion 13, is broken away by striking the same with a sledge or other suitable device. The fracture in the button 7 thus produced carries away sufficient of the edge of the button 7 to expose the molten mass at the interior of the same and between the walls 8 and 9. The fracture having been thus made, the props supporting the pan 11 are removed, permitting the pan to tilt to the position shown in Fig. 3 above a third pan 14. The pan 14 is of a dimension suitable to receive a small and thin button 15 formed by the material from the interior of the first and larger button. When the mass 10 has been entirely bled from the first button, the hollow shell is then lifted out of the pan 11 and placed on a breaking platform or car where it is subjected to cooling by means of water thrown thereon by hosing. The smaller buttons 15 are formed around anchors 16, provided with eyelets 16ª, and set up in the pan 14 prior to pouring the molten mass 10. These buttons, as soon as solidified, are moved to the breaking platform or car and treated in the manner similar to that described with reference to the shells from the center of which the said buttons have been formed. When the water strikes the highly heated mass, a rapid and unequal contraction results, particularly in the shells formed by the walls 8 and 9. This results in fracturing the shells into small and readily handled masses. I have found, in use, that after properly hosing both the shells of the larger buttons and the solid mass of the smaller buttons, that the particles have been so finely comminuted as not to require manual handling or breaking by hammer.

Having thus described my invention, what I claim as new and desire to secure by Letters Patent is:—

1. The method of handling matte, consisting in pouring molten matte into a cooling pan to form a containing shell; then bleeding the interior of said shell of the molten mass therein; and then cooling the said shell at a rate to fracture the same.

2. The method of handling matte, consisting in pouring molten matte into cooling receptacles to form a continuous solid shell having a molten center; then bleeding the said shell of the said molten center by drawing the said molten center into shallow receptacles to form a thin cake; and then rapidly cooling the said shell and said cake to fracture the same.

3. The method of handling matte, consisting in pouring molten matte into shallow cooling receptacles to form a thin edged button; then removing a section of the edge of said button to form an opening to expose the molten mass contained within the center thereof; then decanting the said molten mass through the said opening; and then rapidly cooling the shell to cause automatic fracture thereof.

In testimony whereof I have signed this specification in the presence of two subscribing witnesses.

WILLIAM DOUGLAS KILBOURN.

Witnesses:
E. F. MURDOCK,
PHILIP D. ROLLHAUS.